O. P. DILLS.

Plow-Clevis.

No. 49,733.

Patented Sept. 5, 1865.

Witnesses:
Theo. Tusch
J. M. Covington

Inventor:
O. P. Dill
By Munn & Co.
attys.

UNITED STATES PATENT OFFICE.

O. P. DILLS, OF FALMOUTH, KENTUCKY.

IMPROVEMENT IN PLOWS.

Specification forming part of Letters Patent No. 49,733, dated September 5, 1865.

*To all whom it may concern:*

Be it known that I, O. P. DILLS, of Falmouth, in the county of Pendleton and State of Kentucky, have invented a new and Improved Plow; and I do hereby declare that the following is a full, clear, and exact description thereof, which will enable others skilled in the art to make and use the same, reference being had to the accompanying drawings, forming part of this specification, in which—

Figure 1:
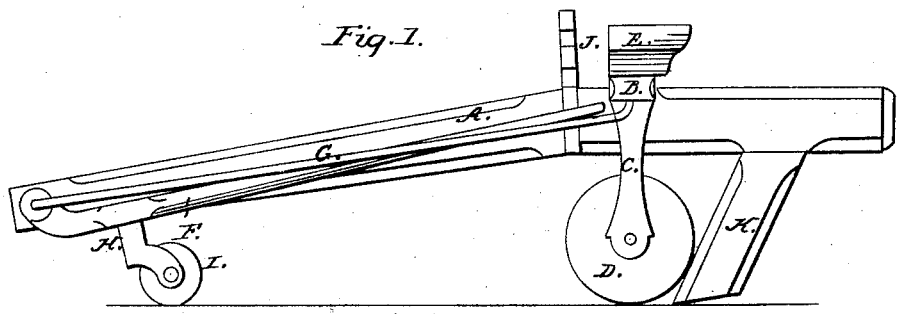
Figure 2:
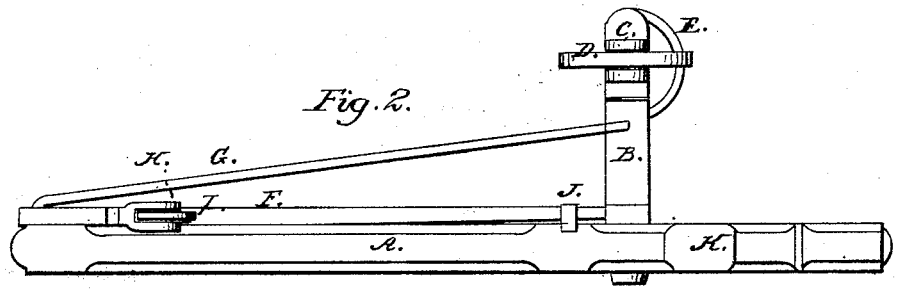

Figure 1 is a side view of my invention; Fig. 2, an inverted plan of the same.

Similar letters of reference indicate like parts.

This invention consists in providing a plow with two wheels arranged in such a manner that the plow will be self-supporting—that is to say, require no guidance, as is the case with the ordinary single plow—and admit of the driver riding on the plow without subjecting it to any increased downward pressure to effect its action in the soil, and at the same time be capable, by a simple manipulation, of being adjusted to penetrate the earth at a greater or less depth, according to the depth of furrow required.

A represents the plow-beam, which may be of the usual or an approximate shape; and B is an arm, which is framed into and projects at right angles therefrom, and has a pendent standard, C, at its outer end, in which a wheel, D, is fitted. On the outer part of this arm B, directly over the wheel D, a seat, E, is secured.

F represents a bar, the front end of which is fitted loosely on a rod, D, which extends from the front end of the beam A to the arm B, about at its center. This rod G serves as a brace for the arm B, as well as a support for the bar F. The bar F has a pendent standard, H, near its front end, in which a wheel, I, is fitted, and the rear of bar F is held by any of a series of notches in an upright, J, attached to the beam A. (See Fig. 1.) The plow-beam A has an inclined standard, K, attached to it, to which a plow of any desired form or pattern is secured. This standard K is just back of the arm B.

From the above description it will be seen that the plow will be supported by the two wheels D I, and will require no guidance as it is drawn along. Consequently no handles are necessary, unless in case of obstruction, attached to the beam; and it will further be seen that, as the driver's seat E is directly over the wheel D, no extra weight will be on the plow when the driver is on the seat, and that the driver, by adjusting the rear end of the bar F higher or lower in the notched upright J, may give the plow of standard K a more or less raking position, according to the depth of furrow required.

This invention is applicable to either right or left hand plows, and to those constructed of either wood or metal.

Having thus described my invention, I claim as new and desire to secure by Letters Patent—

The adjustable bar F, with the wheel I, rack J, wheel D, and standard C, in combination with the rigid arm B, all constructed and arranged substantially as shown and described.

O. P. DILLS.

Witnesses:
   GEO. W. JAMESON,
   J. M. CURRY.